US008314881B2

(12) United States Patent
Mizumura

(10) Patent No.: US 8,314,881 B2

(45) Date of Patent: Nov. 20, 2012

(54) CAMERA SOCKET MODULE

(75) Inventor: Akinori Mizumura, Kanagawa (JP)

(73) Assignee: Molex Incorporated, Lisle, IL (US)

( * ) Notice: Subject to any disclaimer, the term of this patent is extended or adjusted under 35 U.S.C. 154(b) by 435 days.

(21) Appl. No.: 12/440,095

(22) PCT Filed: Sep. 6, 2007

(86) PCT No.: PCT/US2007/019393

§ 371 (c)(1),
(2), (4) Date: Jun. 24, 2010

(87) PCT Pub. No.: WO2008/030492

PCT Pub. Date: Mar. 13, 2008

(65) Prior Publication Data

US 2010/0265389 A1 Oct. 21, 2010

(30) Foreign Application Priority Data

Sep. 6, 2006 (JP) ................................ 2006-241838

(51) Int. Cl.
*H04N 5/225* (2006.01)

(52) U.S. Cl. ......... 348/373; 348/374; 348/375; 348/376

(58) Field of Classification Search ........................ None
See application file for complete search history.

(56) References Cited

U.S. PATENT DOCUMENTS

| | | | | |
|---|---|---|---|---|
| D524,246 S * | 7/2006 | Wang et al. | .................. | D13/147 |
| D524,749 S * | 7/2006 | Wang et al. | .................. | D13/147 |
| 2004/0203264 A1* | 10/2004 | Liao et al. | ....................... | 439/66 |
| 2005/0153600 A1* | 7/2005 | Lu | ................................ | 439/607 |
| 2006/0051986 A1* | 3/2006 | Asai et al. | ....................... | 439/71 |
| 2008/0194122 A1* | 8/2008 | Mizumura | ...................... | 439/65 |
| 2008/0254652 A1* | 10/2008 | Ma | ................................ | 439/67 |
| 2009/0042418 A1* | 2/2009 | Wu | ................................ | 439/81 |
| 2009/0104797 A1* | 4/2009 | Tseng et al. | ................ | 439/76.1 |

FOREIGN PATENT DOCUMENTS

| | | |
|---|---|---|
| JP | S64-51272 | 3/1989 |
| JP | 2002-100440 | 4/2002 |
| JP | 2002100440 A * | 4/2002 |
| JP | 2003-92168 | 3/2003 |
| JP | 3507434 | 3/2004 |

OTHER PUBLICATIONS

International Search Report for PCT/US2007/019393.

* cited by examiner

*Primary Examiner* — Lin Ye
*Assistant Examiner* — John H Morehead, III
(74) *Attorney, Agent, or Firm* — Timothy M. Morella

(57) ABSTRACT

A method of tracking and acting on events related to the delivery of a mail piece is provided. An integrated record associated with an addressee of a mail piece is created. The mail piece is given a unique identifier, is associated with the addressee, and is placed in a mail stream with the date and nature of associated delivery events being recorded. After a predetermined delivery event occurs, a follow-up communication is transmitted to the addressee, and the date of this follow-up communication is recorded. The date of any response by the addressee to the follow-up communication is also recorded. To the integrated record associated with the addressee is added the date and nature of the delivery events associated with the mail piece, the date of the follow-up communication, and the date of any response by the addressee to the follow-up communication.

20 Claims, 8 Drawing Sheets

PRIOR ART

CAMERA SOCKET MODULE

BACKGROUND OF THE INVENTION

The present invention relates generally to a socket for a module, and more particularly to a socket of improved connection reliability.

Conventionally, sockets have been used to mount camera modules, which integrates an image pickup device such as a CCD (Charge Coupled Device), a CMOS (Complementary Metal Oxide Semiconductor) image sensor, or the like, and an optical element such as a lens, on a substrate of a small electronic device such as a cellular telephone, a PDA (Personal Digital Assistant), or the like. One such structure is described in Japanese Patent Application Laid-Open (Kokai) Publication No. 2003-91685).

FIG. 10 is a cross-sectional view of such a conventional camera module socket.

801 denotes the socket housing for a module, while 802 denotes the camera module, which is received in the socket housing 801. Also, two sets of locking devices 804 are provided on the inner surfaces of facing sidewalls of the socket housing 801 and engage locking surfaces 810 formed on the shoulder portions of the camera module 802 for locking the camera module 802 in place.

Each set of locking devices 804 include locking elements 805 and 806 having different heights. This is an arrangement to deal with the fact that a small module 802*a* having a relatively small outer dimension and a large module 802*b* having a relatively large outer dimension exist in the same kind of camera modules 802 due to dimensional errors in manufacturing. In the case of the small module 802*a*, the locking element 806 located at a lower position engages the locking surface 810, and in the case of the large module 802*b*, the locking element 805 located at a higher position engages the locking surface 810.

In addition, connection terminals 807 are provided on the bottom of the socket and protrude upward from the bottom 808 due to their spring property in order to contact members formed on the bottom of the camera module 802. Then, the height of protrusion of the connection terminal 807 must be lesser for the small module 802*a*, larger for the large module 802*b*.

However, in the conventional socket for a module, two locking positions are provided by means of locking elements 805 and 806 which deal with variations of the contact force of the connection terminal 807 due to a change in the height of protrusion of the connection terminal 807 caused by dimensional errors in manufacturing of the modules 802. In order to provide a plurality of locking positions in this way, the shape of the locking elements 805 and 806 and the structure of the module socket are complicated. A structure to obtain more stable contact is not sufficiently considered. Therefore, the contacting state between the connection terminal 807 and the contact member formed on the bottom of the camera module 802 becomes unstable. Also, the contact between the connection terminal 807 and the contact member formed on the bottom of the module 802 cannot be reliably maintained when the socket receives an impact from the outside due to any cause which may occur.

SUMMARY OF THE INVENTION

The present invention has been made taking the foregoing problems of the above-described conventional socket for a module into consideration and an object of the present invention is to provide a module socket, with a lesser number of parts, with a low cost due to decrease of the number of assembling steps, a stable contact force of terminals, reliably maintains a contact state with contact members of a module, and has a strong locking function for the module, and prevents slipping off of the module, by dividing terminals provided in a housing into upper and lower contacting portions for contacting contact members formed on the bottom of the module.

Therefore, a socket for a camera module, according to the present invention, includes: a housing member made of an insulating material and side walls defining the sides of the module; a plurality of terminals provided in the housing member; and elastic engagement (or locking) elements extending inward from the side walls for securing the module at a predetermined position in the insertion direction wherein each of the terminals comprises cantilever-like first and second contact arm portions with respective first and second contacting portions formed thereon for contacting contact members on the bottom of the module, and wherein the upper end of the first contacting portion is disposed higher than the upper end of the second contacting portion, in the state in which the module is not inserted in the socket.

In another module socket according to the present invention, the first or second contacting portions elastically contact the contact members and applies an upward force to the module, when the module is inserted in a predetermined position.

In a further socket according to the present invention, the position of the upper end of the first contacting portion and the position of the upper end of the second contacting portion are determined so as to correspond respectively lower limit and upper limit of the dimensional errors of the module.

In a still further socket of the present invention, the first and second contacting portions of each terminal are provided for the same contact member on the module.

In a further socket according to the present invention, the first and second contacting portions of each terminal project higher than the bottom plate portion, when the module is inserted in the socket.

In a still further socket according to the present invention, the module is provided with engagement shoulder portions on its sides, and is sandwiched and held vertically by elastic engagement elements engaging upper surfaces of the engagement shoulder portions, and the first or second contacting portions contacting the contact members, in the state in which the module is inserted in a predetermined position.

According to the present invention, the terminals provided in the housing are divided into upper and lower contacting portions for contacting contact members formed on the bottom of the module. Therefore, it is possible to provide a socket with a lesser number of parts, a low cost due to decrease of the number of assembling steps, a stable contact force for its terminals, which reliably maintains a contact state with contact members of the module, has a strong function to lock the module, and can prevent slipping off of the module.

DESCRIPTION OF THE PREFERRED EMBODIMENTS

Figure 1:
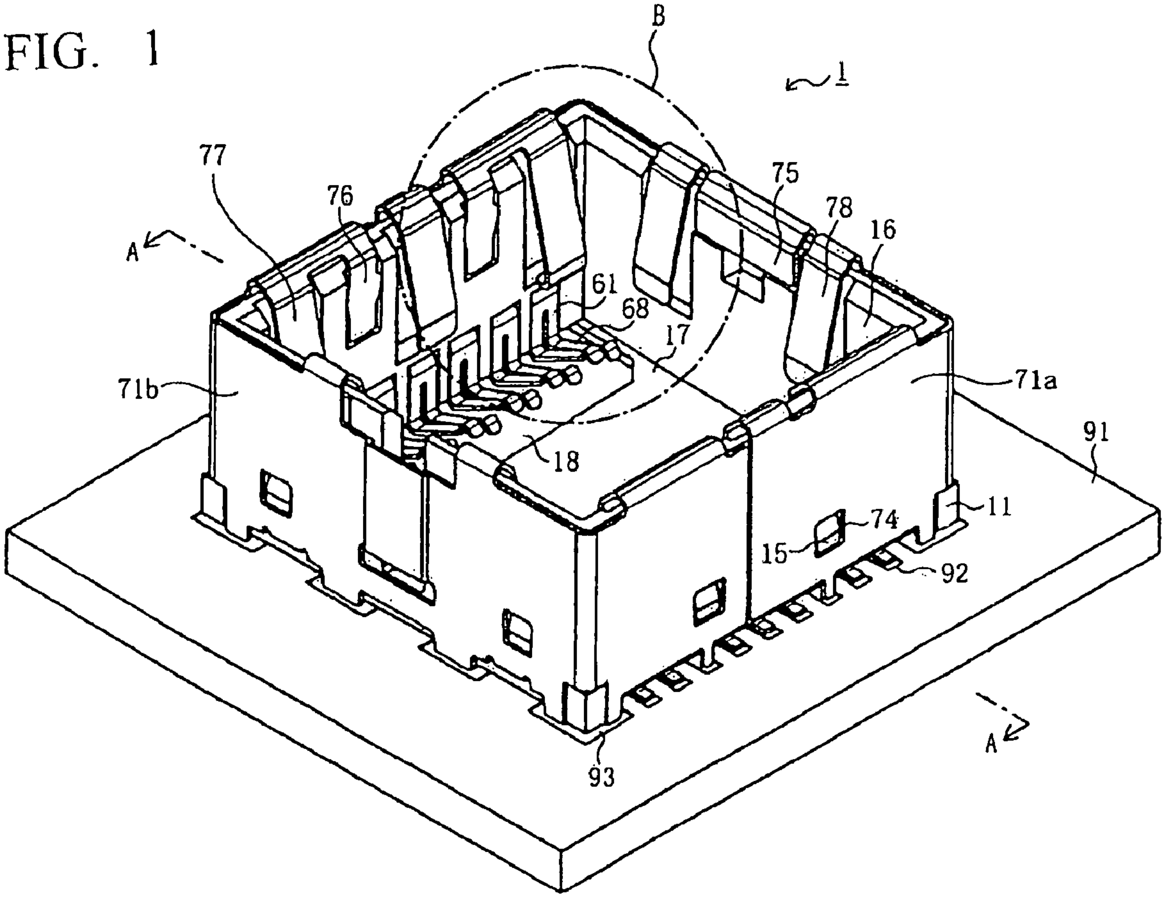
FIG. 1 is a perspective view of a socket according to one embodiment of the present invention.

FIG. 1 is a perspective view of a socket according to an embodiment of the present invention, and reference numeral 1 denotes a socket for a module constructed in accordance with the principles of the present invention, which is used for electrically connecting a camera module 101 to a substrate 91. The camera module 101 preferably integrates an image pickup device such as a CCD, a CMOS image sensor, or the like and an optical element such as a lens. However, the module 101 may be any kind of module including a sensor module such as an infrared sensor or finger print reading sensor or acoustic element module such as a microphone. The socket 1 is used for mounting the module 101 in a small electronic device such as a cellular telephone, a PDA, or the like, but the socket 1 may also be used for mounting the module in a household electrical appliance such as a TV set, a washing machine, and a refrigerator, a monitor for security, and an automobile or the like. The socket 1 is mounted on the substrate 91 such as a printed circuit board and the substrate 91 may be made of any material, rigid or flexible.

In addition, in this embodiment, representations of directions such as up, down, left, right, front, rear, and the like, used for explaining the structure and movement of each portion of the socket 1, and the like, are not absolute, but relative. These representations are appropriate when the socket 1 is in the position shown in the figures. If the position of the socket 1 changes, it is assumed that these representations are to be changed according to the change of the position of the socket 1 or its constituent portion.

Figure 2:
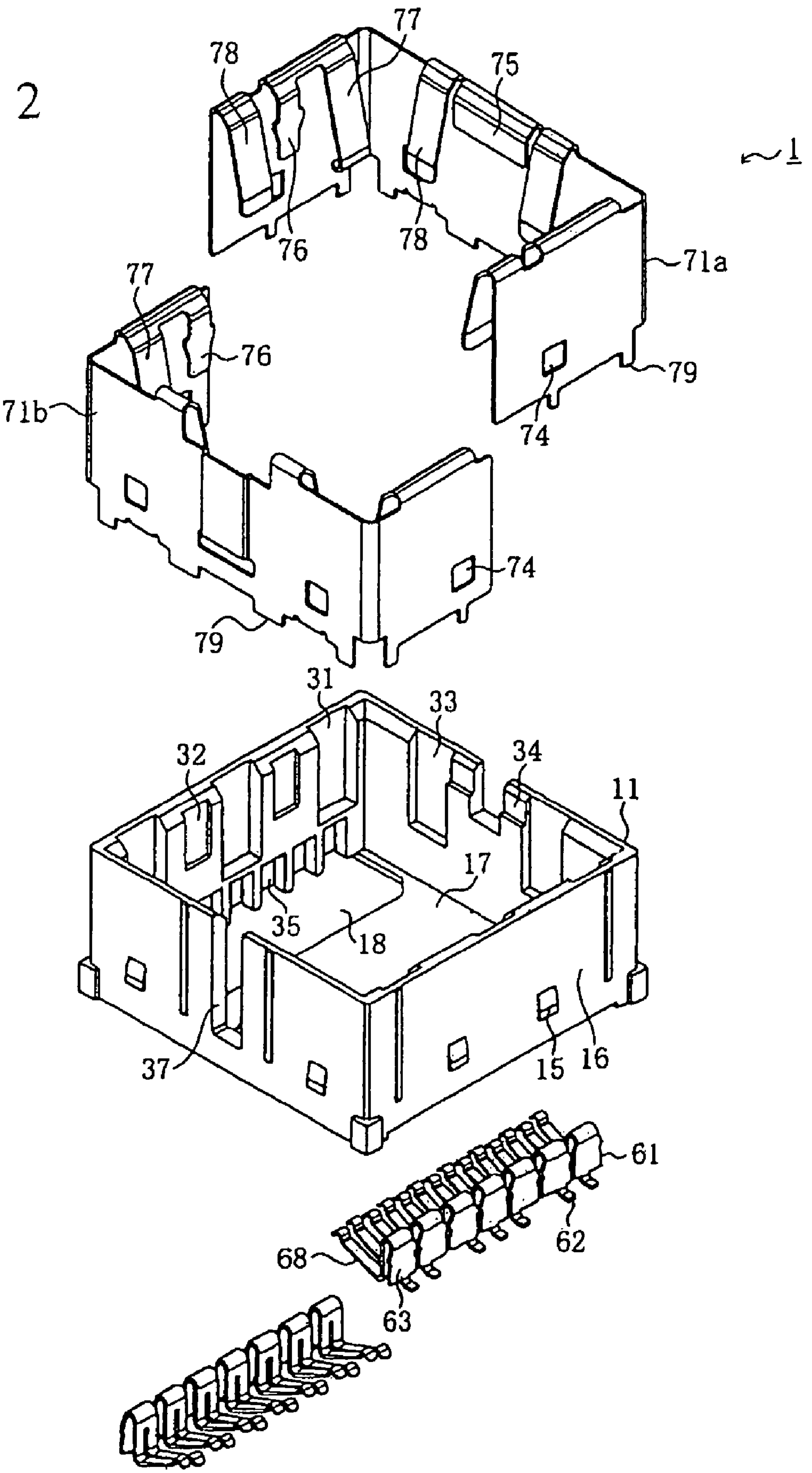
FIG. 2 is an exploded view of the socket of FIG. 1.

As shown in FIG. 2, the socket 1 has a housing member 11 that accommodates the module 101 therein, terminals 61 disposed in the housing member 11, and a shell 71 attached to the housing member 11. The socket 1 is provided with the shape of a container with a bottom having an open end. Further, in the illustrated example, the shell 71 is made of two portions, namely, a first shell 71*a* and a second shell 71*b*, but, the shell 71 may be formed as a single member. This description, the first and second shell 71*a*, 71*b* will be explained collectively as the shell 71. Further, the present embodiment will be described with reference to the case in which the socket 1 has the shape of a container with a bottom, which is approximately rectangular with one end surface being closed, and the other end surface being opened.

The housing member 11 is a hollow rectangular plate-like member, which is formed by an insulating material such as a synthetic resin, and has a bottom plate portion 17 and four side walls 16 extending upwardly from the bottom plate portion 17 to define an interior cavity and to surround the side surfaces of the module 101.

The first shell 71*a* and second shell 71*b* are attached to the side walls 16. A plurality of conductive terminals 61 are attached in parallel, to each of the lower end portions of a pair of facing inner surfaces of the side walls 16. A plurality of terminal mounting concave portions, or recesses, 35 are formed in parallel in each of the lower end portions of the pair of inner surfaces of the side walls 16 for arranging the terminals 61 in the lower end portions of the pair of inner surfaces. The terminals 61 are loaded in the terminal mounting concave portions 35 one by one. A base portion 63 of the terminal 61 is housed in the terminal mounting concave portion 35 and fixed thereto. Here, the number and the arrangement of the terminals 61 and the terminal mounting concave portions or recesses 35 may be appropriately decided to fit the module.

The bottom plate portion 17 corresponds to the bottom of the socket and the bottom plate portion 17 has a rectangular shape with a width narrower than that of the bottom, and terminal accommodating openings 18 are formed on either side of the bottom plate portion 17. The terminal openings 18 correspond to the terminals 61 attached to the lower end portions of a pair of facing inner surfaces of the side walls 16. Further, the terminal accommodating opening 18 is formed in such a size as to accommodate a contact arm portion 68 of the terminal 61.

Engagement projections 15 are formed on the outer surfaces of the side walls 16, and engagement openings 74 are formed in the metal shell 71 that engage with the engagement projections 15. Therefore, the metal shell 71 is prevented from being detached from the side walls 16. In addition, a polarizing groove 37 in the form of a slit is formed in one side wall 16, into which a polarizing key 115 of the module 101 is inserted. The upper end portions of the inner surfaces of the side walls 16 have first engagement concave portions 34, second engagement concave portions 32, locking spring member concave portions 31, and grounding spring member concave portions 33, formed therein which correspond to first engagement portions 75, second engagement portions 76, locking spring members 77 and grounding spring members 78 of the metal shell 71.

Each of the first shell 71*a* and second shell 71*b* stamped and formed from a metal block. Then the first engagement portions 75, the second engagement portions 76, the locking spring members 77, and grounding spring members 78 are formed by inwardly bending them from the upper edge of the body of the metal shell 71 inwardly and downwardly along the upper edge. Here, the first engagement portions 75 and the second engagement portions 76 extend downward approximately parallel with the body of the shell 71 and are accommodated in the first engagement concave portions 34 and the second engagement concave portions 32 in the inner surfaces of the side walls 16. The second engagement portions 76 extend to a position lower than the first engagement portions 75, and the projections formed on the both sides of the second engagement portions 76 bite into the both side surfaces of the second engagement concave portions 32 to engage with the second engagement concave portions 32 of the housing.

In addition, the locking spring members 77 and the grounding spring members 78 are elongated members in the form of tangs that extend to a position lower than the second engagement portions 76 and are inclined toward the center of the socket so that the lower ends thereof being free lower ends. Further, the grounding spring members 78 are arranged on the all side surfaces of the side walls 16, while the locking spring members 77 are arranged only on a pair of inner surfaces of the side walls 16 in which the terminals 61 are arranged.

The leading end of the free end portion of each locking spring member 77 is largely curved outward and becomes approximately horizontal. (FIG. 3) Thereby, when mounting the module 101, the curved surfaces of the free ends of the locking spring members 77 contact the side surfaces of the module 101, so that the side surfaces of the module 101 smoothly move without resistance even if the side surfaces of the module 101 move while contacting the free end portions of the locking spring members 77. The leading ends of the free end portions of the locking spring members 77 engage with the upper surface of an engagement shoulder portion 117 (FIG. 7) of the module 101 and the leading ends of the free end portions of the locking spring members 77 are horizontal, and as a result, the engagement of the leading ends of the free end portions of the locking spring member 77 with the upper surface of the engagement shoulder portion 117 becomes reliable and the leading ends of the free end portions of the locking spring member 77 are not detached from the upper surface of the engagement shoulder portion 117.

The leading ends of the free end portions of the grounding spring member 78 are slightly curved downward and become approximately vertical. Thereby, when mounting the module 101, the curved surface of the free end portions contact the side surface of the module 101, so that the side surface of the module 101 can smoothly move without receiving a resistance even if the side surface of the module 101 moves while contacting the free end portions of the grounding spring member 78.

A plurality of lower side projections 79 extend downward and are connected to the lower edge of the body of the shelf 71. The lower ends of the lower side projections 79 are connected to shell connection pads 93 exposed to the surface of the substrate 91 by means such as soldering. The shell connection pads 93 are connected to grounding traces or the like (not illustrated), the metal shell 71 has the same potential as that of the ground traces by connecting the lower side projections 79 to the shell connection pads 93, whereby the metal shell 71 functions as an electromagnetic shield.

Figure 8:
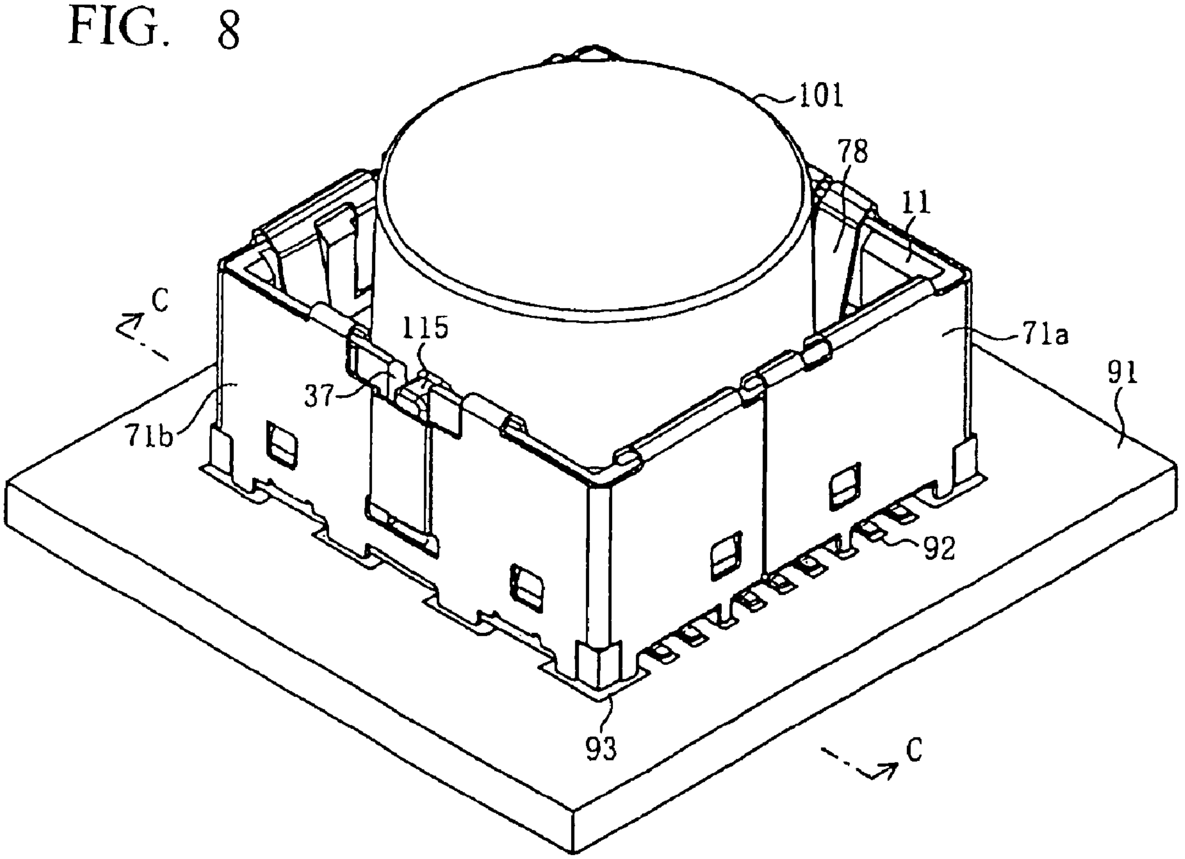
FIG. 8 is a perspective view of the socket after receiving the module therein.

Terminal connection pads 92 are also exposed on the surface of the substrate 91 (FIG. 8). A tail portion 62 of each terminal 61 is connected to the terminal connection pad 92 by soldering. The terminal connection pads 92 are connected to signal traces and/or power traces or the like (not illustrated).

Figure 3:
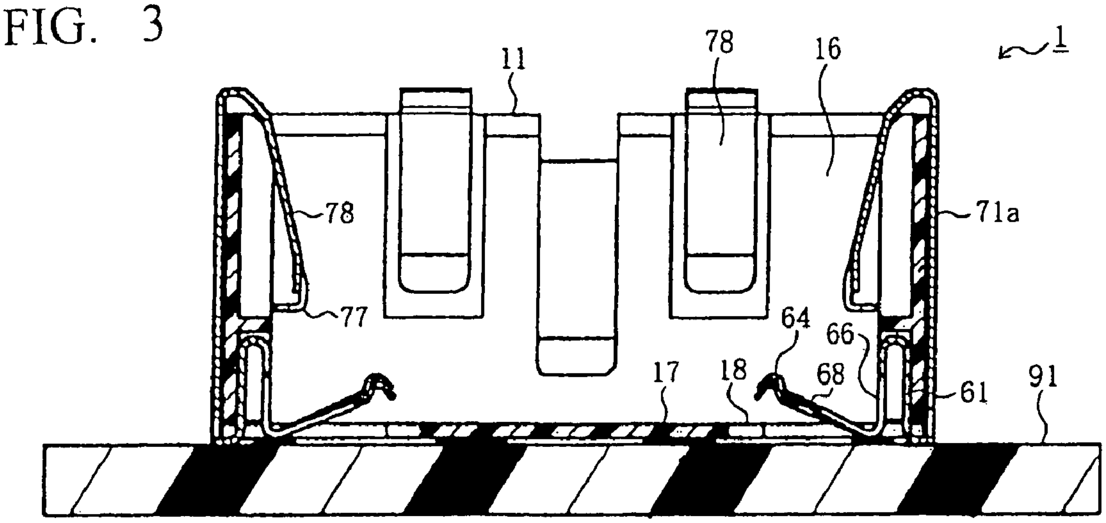
FIG. 3 is a cross-sectional view of the socket of FIG. 1, taken along line A-A thereof.
Figure 4:
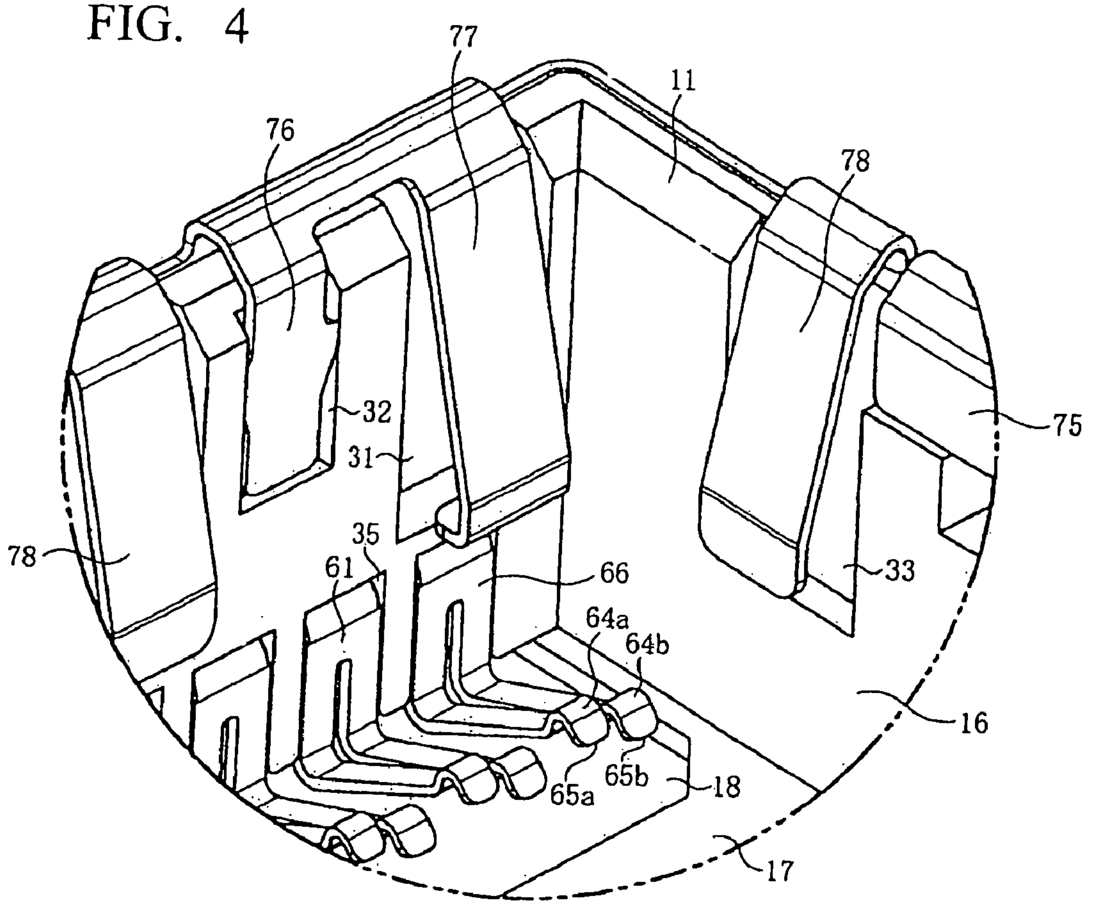
FIG. 4 is an enlarged view of the major part of the socket of the present invention, showing the portion B.
Figure 5:
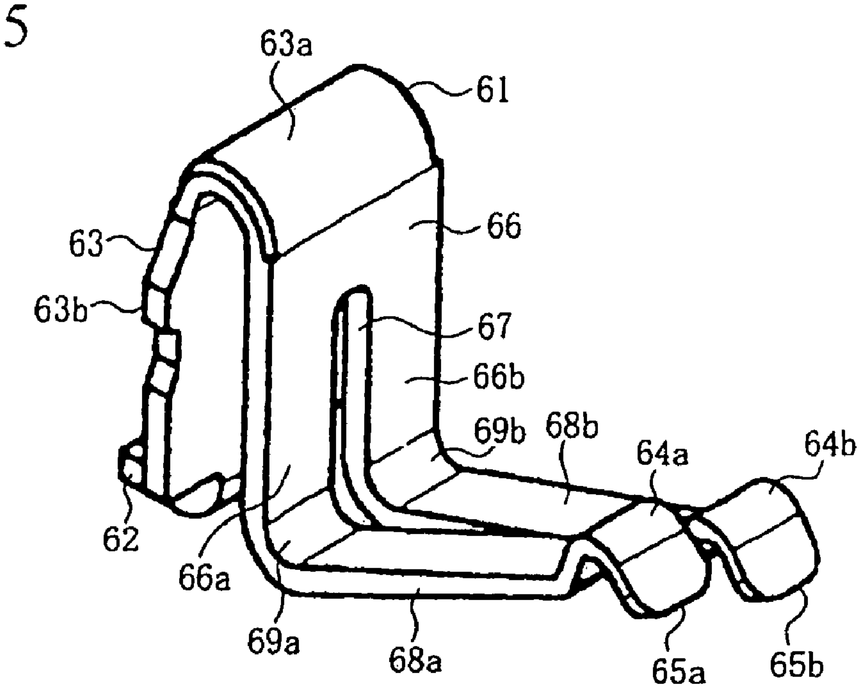
FIG. 5 is a perspective view of a terminal used with sockets of the present invention.
Figure 6:
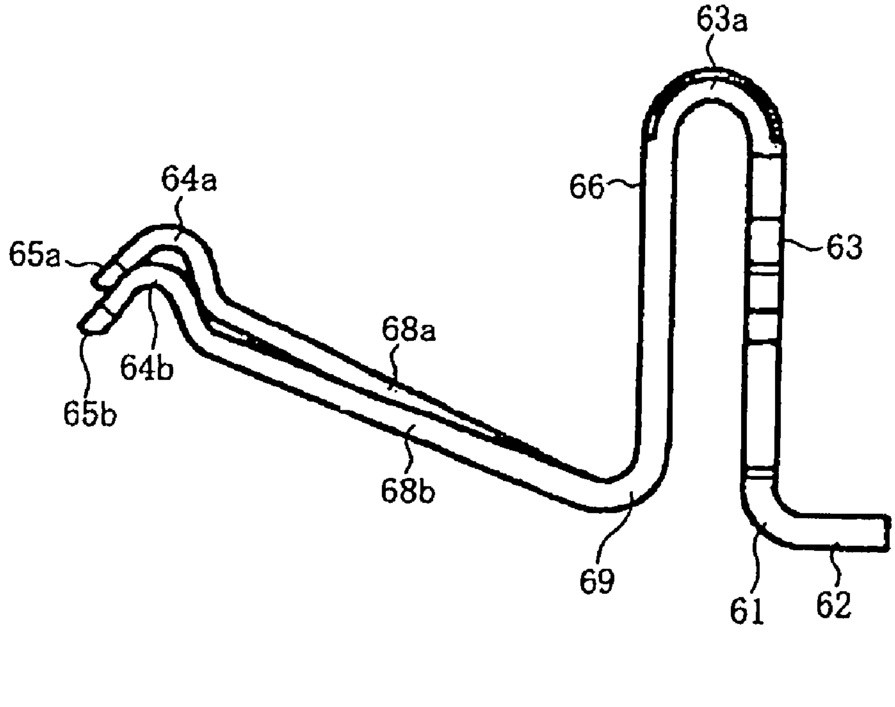
FIG. 6 is a side view of the terminal of FIG. 5.

FIG. 3 is a cross sectional view of the socket according to the embodiment of the present invention, taken along the line A-A of FIG. 1, FIG. 4 is an enlarged view of the major part of the socket according to the embodiment of the present invention, showing the portion B of FIG. 1, FIG. 5 is a perspective view of the terminal according to the embodiment of the present invention, and FIG. 6 is a side view of the terminal according to the embodiment of the present invention.

As shown in FIG. 5, the terminal 61 is formed by punching a metal plate and bending the plate, and the terminal 61 has a base portion 63, a tail portion 62, a curved portion 63*a*, a contacting portion 64, a leading end portion 65, a body portion 66, a contact arm portion 68 and an arm connecting portion 69. The base end 63 vertically extends and the horizontal tail portion 62 is connected to the lower end of the base portion 63, while being bent approximately at a right angle. Projecting portions 63*b* are formed on the opposite sides of the base portion 63 so as to engage or bite into the opposite end surfaces of the terminal mounting concave portion 35.

The body portion 66 is a vertically extending flat member, and its upper end is integrally connected to the upper end of the base portion 63 via the curved portion 63*a*. The curved portion 63*a* is a portion which is bent over approximately 180 degrees, and as shown in FIGS. 3 and 6, the side surfaces of the continuous base portion 63, curved portion 63*a*, and body portion 66 form approximately a U-shape. The body portion 66 is approximately flush with the inner surface of the side wall 16 of the housing member 11 when the terminals 61 are fixed to the terminal mounting concave portion 35, as shown in FIGS. 3 and 4.

On the other hand, the contact arm portion 68 is connected to the lower end of the body portion 66 via the arm connecting portion 69. The arm connecting portion 69 is a portion which is preferably curved not less than 90 degrees, so that the contact arm portion 68 extends obliquely upward from the lower end of the body portion 66, as shown in FIGS. 3 and 6. The contacting portion 64 bulging upward is formed on the free end of the contact arm portion 68 and the leading end portion 65 of the contact arm portion 68 continued to the contacting portion 64 is faced downward. Therefore, when the module 101 is not mounted, the contact arm portion 68 projects upward from the upper surface of the bottom plate portion 17 of the housing member 11, and the upper end of the contacting portion 64 is spaced apart from and upward from the upper surface of the bottom plate portion 17. The body portion 66, the arm connecting portion 69 and the contact arm portion 68 are elastic, and when the module 101 is mounted in the socket, the contacting portion 64 located at the free end of the cantilever-like or cantilever-shaped contact arm portion 68 is pressed downward by the bottom surface of the module 101 and is elastically deformed so that a repulsion force is generated. The contacting portion 64 is urged upward due to this repulsion force and pressed against the contact member formed on the bottom surface of the module 101. This makes it possible to reliably maintain contact between the terminal contacting portions 64 and the contact members of the module 101. Where the contacting portion 64 is pressed downward by the bottom surface of the module 101, the contact arm portion 68 becomes approximately parallel with the upper surface of the substrate 91 and is accommodated in the terminal accommodating opening 18, and the contact arm portion 68 is positioned at a position lower than the upper surface of the bottom plate portion 17, except for the contacting portion 64.

In the present embodiment, a slit 67 is formed in the terminal 61 (FIG. 5), so that the contacting portion 64, the leading end portion 65, the body portion 66, the contact arm portion 68 and the arm connecting portion 69 are divided by this slit 67 into left and right, first and second contacting portions 64*a* and 64*b*, first and second leading end portions 65*a* and 65*b*, first and second body portions 66*a* and 66*b*, first and second contact arm portions 68*a* and 68*b*, and first and second arm connecting portions 69*a* and 69*b*, respectively. Here, when the first and second contacting portions 64*a* and 64*b*, the first and second leading end portions 65*a* and 65*b*, the first and second body portions 66*a* and 66*b*, the first and second contact arm portions 68*a* and 68*b*, and the first and second arm connecting portions 69*a* and 69*b* are explained in an integrated manner, respectively, as described above, they will be explained as the contacting portion 64, the leading end portion 65, the body portion 66, the contact arm portion 68, and the arm connecting portion 69.

The slit 67 as shown in FIG. 5 starts from the middle of the body portion 66, however, the length of the slit 67 can be changed appropriately. The slit 67 may be formed at least in the range of the contacting portion 64, the leading end portion 65, the contact arm portion 68, and the arm connecting portion 69, and not in the body portion 66 or the slit 67 may start from the upper end of the body portion 66 variations of this structure are contemplated.

The degree of curvature of the first arm connecting portion 69*a* is larger than that of the second arm connecting portion 69*b*, and the angle between the first body portion 66*a* and the first contact arm portion 68*a* is smaller than the angle between the second body portion 66*b* and the second contact arm portion 68*b*. In other words, the first contact arm portion 68*a* is inclined with respect to the upper surface of the bottom plate portion 17 more largely as compared to the second contact arm portion 68*b*. The position of the upper end of the first contacting portion 64*a* is separated from the upper surface of the bottom plate portion 17 upward more largely as compared to the position of the upper end of the second contacting portion 64*b*.

The degree of curvature of the first arm connecting portion 69*a* and the degree of curvature of the second arm connecting portion 69*b* are determined so that the position of the upper end of the first contacting portion 64*a* and the position of the upper end of the second contacting portion 64*b* correspond to respective lower limits and upper limits of the manufacturing tolerances, of the module 101. The position of the upper end of the first contacting portion 64*a* is determined to have such a height that reliable contact between the first contacting portion 64*a* and the contact member of the module 101 can be maintained, and the height positions of two contact portions have a difference between the maximum and minimum dimensions in the range of the manufacturing tolerance of the module 101 so that even if the distance between the upper surface and the bottom surface of the engagement shoulder portion 117 of the module 101 is equal to the lower limit of tolerance.

The height of the upper surface of the engagement shoulder portion 117 of the module 101 is limited by engaging with the leading end of the free end portion of the locking spring member 77. Thus if the distance between the upper surface and the bottom surface of the engagement shoulder portion 117 is small, the bottom surface is located at a higher position, and if the distance between the upper surface and the bottom surface of the engagement shoulder portion 117 is large, the bottom surface is located at a lower position. Because the body portion 66, the contact arm portion 68, and the arm connecting portion 69 of the terminal 61 are elastically deformed, the contacting portion 64 is vertically displaced and follows the bottom surface of the module 101 by an elastic repulsion force generated by the body portion 66, arm connecting portion 69, and the contact arm portion 68 and it maintains control pressure against the contact member on the bottom surface of the module 101, even if the height of the bottom surface of the module 101 is varied but it is in a predetermined range. If the range of variation in the height of the bottom surface of the module 101 is larger than such a range that the body portion 66, the arm connecting portion 69, and the contact arm portion 68 can generate a sufficient repulsion force, the contacting portion 64 is not pressed against the contact member formed on the bottom surface and this makes it impossible to maintain contact between the contacting portion 64 and the contact member. In addition, if the height of the bottom surface of the module 101 is too low, the body portion 66, the arm connecting portion 69, and the contact arm portion 68 are deformed exceeding the range of their elastic deformation and they may be plastically deformed. Then, the body portion 66, the arm connecting portion 69, and the contact arm portion 68 cannot be elastically deformed again.

Therefore, in the present invention, by determining the degree of curvature of the first arm connecting portion 69*a* and the degree of curvature of the second arm connecting portion 69*b* so that the positions of the upper ends of the first and second contacting portions 64*a* and 64*b* correspond to the lower limit and the upper limit of the tolerance, respectively, the position of the bottom surface of the module 101 resides in such a range that the first body portion 66*a*, the first arm connecting portion 69*a*, and the first contact arm portion 68*a* can generate a sufficient repulsion force even if the distance between the upper surface and the bottom surface of the engagement shoulder portion 117 of the module 101 is in the range near the minimum value, and the position of the bottom surface of the module 101 resides in such a range that the second body portion 66*b*, the second arm connecting portion 69*b*, and the second contact arm portion 68*b* can generate a sufficient repulsion force even if the distance between the upper surface and the bottom surface of the engagement shoulder portion 117 of the module 101 is in the range near the maximum value. At least one or both of the first contacting portion 64*a* and the second contacting portion 64*b* will reliably maintain contact with the contact member formed on the bottom surface even if there is a variation in the dimension of the module 101.

Figure 7:
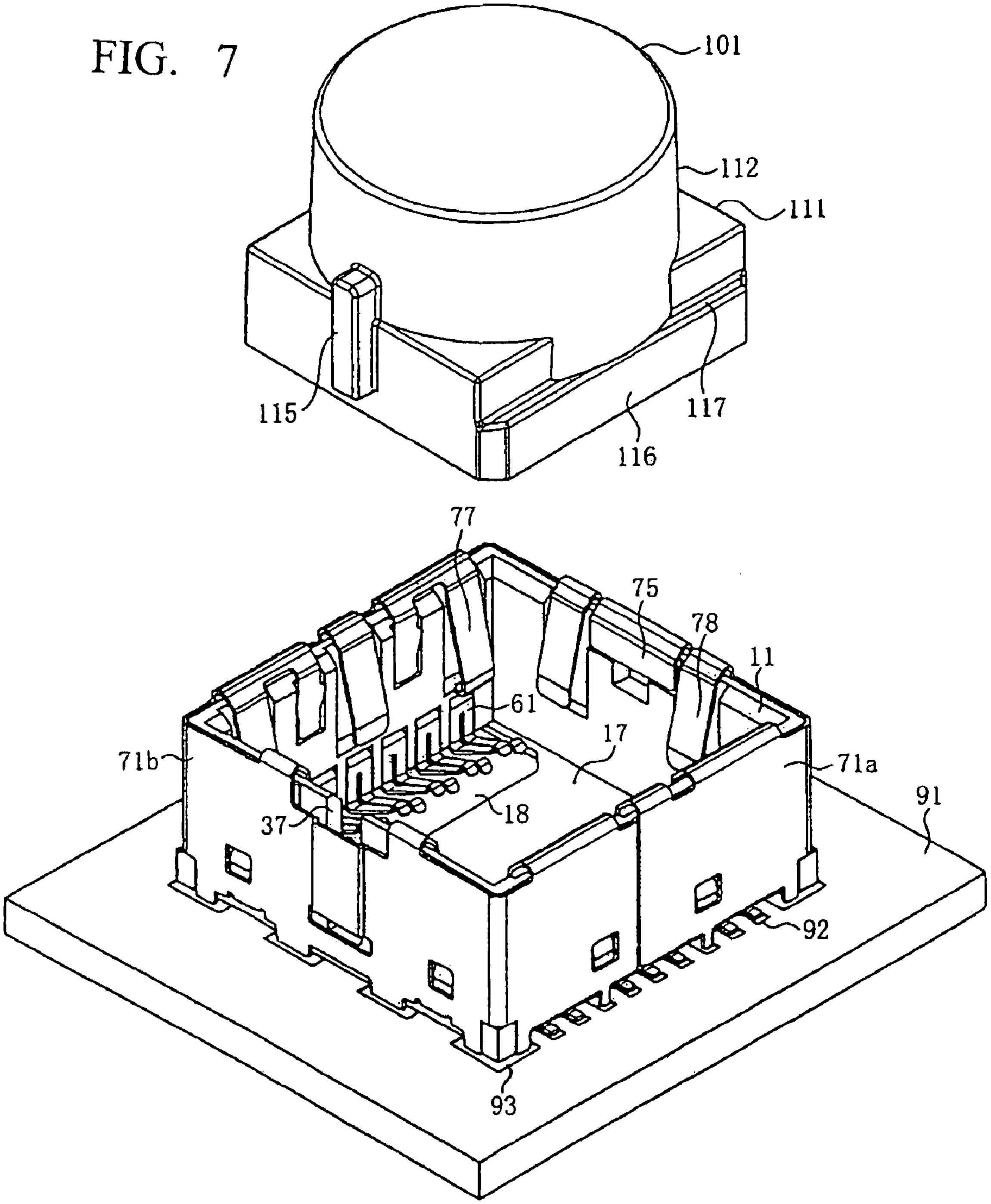
FIG. 7 is a perspective view showing the positional relation between the module and the socket before being mounted therein.

FIG. 7 is a perspective view showing a positional relation between the module and the socket before being mounted according to the embodiment of the present invention.

The substrate 91 has signal and power traces (not shown) which are connected to the terminal connection pads 92, which are exposed to the upper surface at least in the region where the socket 1 is attached, so that it is possible to connect the terminals 61 of the socket 1 to the connection pads 92 by soldering or the like. The lower surfaces of the tail portions 62 of the terminals 61 are also connected to the connection pads 92 by soldering. The metal shell connection pads 93 for attaching the shell 71 are arranged on the surface of the substrate 91 so that the lower side projections 79 of the shell 71 can be connected to the connection pads 93 by soldering. At least some of shell connection pads 93 are connected to ground traces of the substrate 91.

In attaching the socket 1 to the substrate 91 by soldering, a paste type solder is applied to the upper surfaces of the terminal connection pads 92 and the shell connection pads 93, and soldering is then performed by reflowing the solder. The socket 1 is placed on the substrate 91 so that the corresponding tail portions 62 of the terminals 61 and the corresponding lower side projections 79 of the shell 71 are positioned on the terminal connection pads 92 and the shell connection pads 93. Then, soldering is carried out by heating and reflowing the solder in a heating furnace or the like.

Before the module 101 is mounted, the free ends of the contact arm portions 68 of the terminals 61 are largely protruding upward from the upper surface of the bottom plate portion 17 of the housing member 11, as shown in FIG. 4. In this case, it can be seen that the first contact arm portions 68*a* are inclined more largely than the second contact arm portions 68*b* and the upper ends of the first contacting portions 64*a* are located higher than the upper ends of the second contacting portions 64*b*. The free ends of the locking spring members 77 and the grounding spring members 78 are protruding from the inner surface of the side walls 16 of the housing member 11 inward largely.

Figure 9:
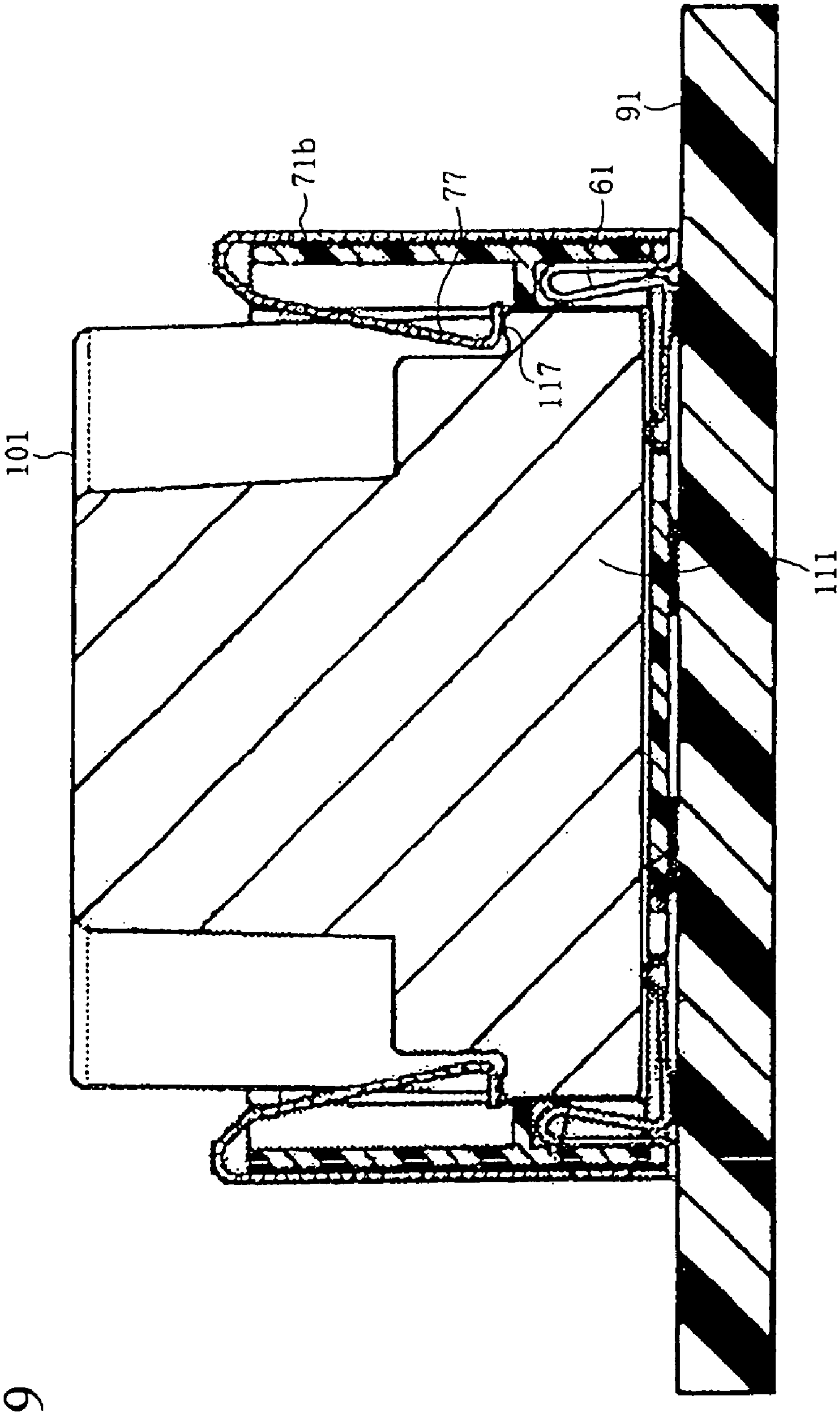
FIG. 9 is a cross-sectional view of FIG. 8 after mounting the module therein, taken along the line C-C thereof.
Figure 10:
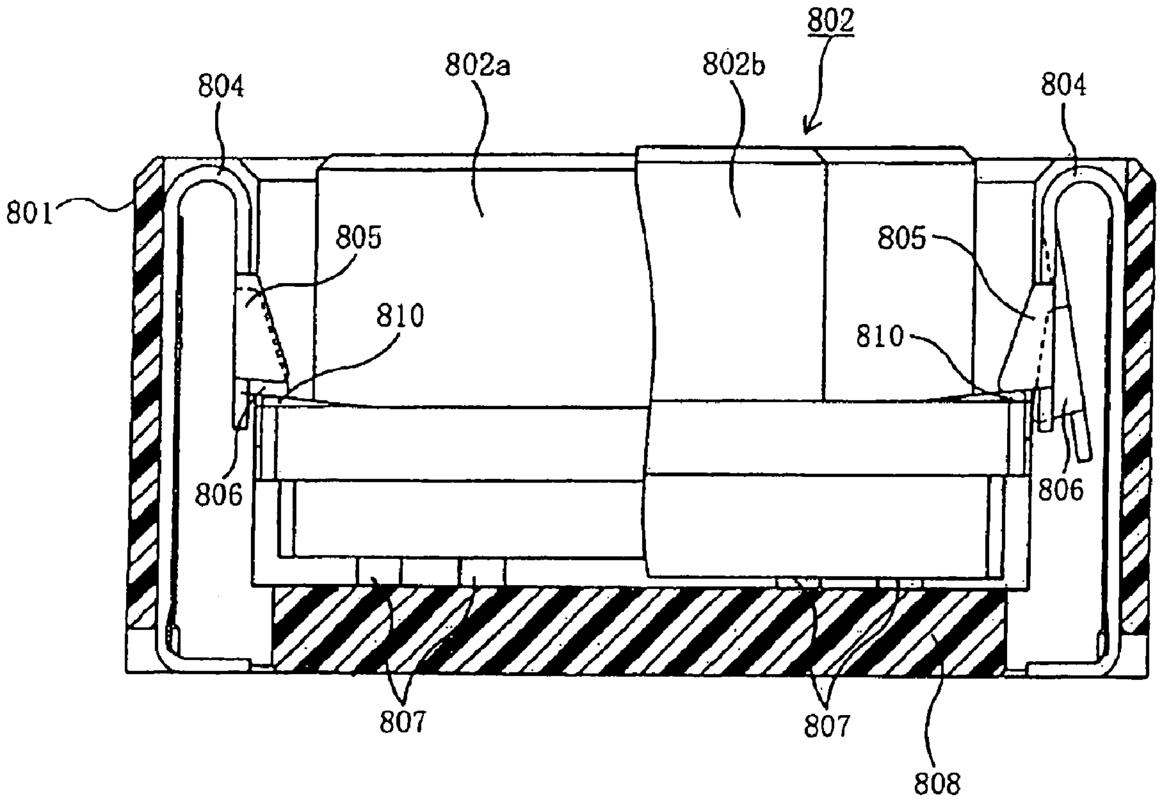
FIG. 10 is a cross-sectional view of a conventional camera module socket.

The module 101 is inserted in the housing member 11 as shown in FIG. 7, and mounted on the socket 1 as shown in FIGS. 8 and 9. The module 101 has an upper portion 112 in the shape of approximately a circular column and a lower portion 111 in the shape of approximately a rectangular solid. A polarizing key 115, which vertically extends and projects, is formed on one side surface of the lower portion 111 and is received in the polarizing groove 37 formed in the side wall 16 of the housing member 11.

The lower halves of a pair of opposite side surfaces of the lower portion 111 are formed as bulging portion 116 that extends outwardly, and the engagement shoulder portion 117 is formed on the boundary between the upper half of the side surface and the side surface of the bulging portion 116. The upper surface of the engagement shoulder portion 117 extends horizontally, and is engaged by the horizontal leading ends of the free end portions of the locking spring members

77 when the insertion of the module 101 into the housing member 11 is completed (FIG. 9).

A metallic coating is preferably formed on the side surfaces of the lower portion 111, and the module 101 is electrically connected to the shell 71 by the free ends of the grounding spring members 78 contacting thereto when the insertion of the module 101 into the housing member 11 is completed. The contact members (not illustrated) are exposed to the bottom surface of the module 101, and are connected to the contacting portions 64 of the corresponding terminals 61 when the insertion of the module 101 into the housing member 11 is completed. The module 101 is inserted into the housing member 11 with a predetermined orientation, by inserting the polarizing key 115 into the polarizing groove 37, so that predetermined contact members exposed to the bottom surface of the module 101 are connected to predetermined terminals 61.

When the module 101 is inserted into the housing member 11, the side surfaces of the lower portion 111 of the module 101 move while contacting the free ends of the locking spring members 77 and the grounding spring members 78. When the insertion of the module 101 into the housing member 11 is completed (FIG. 9), the horizontal leading ends of the free end portions of the locking spring members 77 engage with the upper surface of the engagement shoulder portions 117 of the module 101. The free end portions of the grounding spring members 78 are pressed by the side surface of the lower portion 111 of the module 101. In this case, electrical contact between the free ends of the grounding spring members 78 and the metallic coating formed on the side surfaces of the lower portion 111 is secured by the grounding spring members 78.

When the module is mounted, the body portions 66, the arm connecting portions 69, and the contact arm portions 68 of the terminals 61 are elastically deformed since the contacting portions 64 are pressed from above by the contact members exposed to the bottom surface of the module 101, and take the shape as shown in FIG. 9. Therefore, electrical contact between the contacting portions 64 and the contact members of the module 101 is secured, by the spring function or nature of the body portions 66, the arm connecting portions 69, and the contact arm portions 68. The module 101 receives the force to push it upward by the function of the terminal body portions 66, the arm connecting portions 69, and the contact arm portions 68 as a spring. However, the upward movement is restricted since the free ends of the locking spring members 77 engage with the upper surface of the engagement shoulder portions 117. The module 101 is elastically held as being sandwiched vertically by the terminals 61 and the locking spring members 77, so that the module 101 does not jump or bounce vertically.

The terminal 61 is divided into the right and left parts by the slit 67, the first contact arm portions 68*a* are inclined more largely than the second contact arm portions 68*b*, and the upper ends of the first contacting portions 64*a* are located higher than the upper ends of the second contacting portions 64*b*. If the dimensions of the modules 101 vary, at least any of the first contacting portions 64*a* or the second contacting portions 64*b* can reliably maintain contact with the contact members formed on the bottom surface. At least any of the first contacting portions 64*a* or the second contacting portions 64*b* applies a force to push the module 101 upward, the module 101 is elastically held or sandwiched vertically between the terminals 61 and the locking spring members 77 even if the dimensions of the module 101 vary. Each terminal 61 has a plurality of places for contacting the contact member of the module 101, the contact of the terminal 61 with the contact member is reliably maintained even if the socket 1 receives impact from the outside.

The module 101 is elastically sandwiched from the opposite sides by the function of the locking spring members 77, and also is sandwiched from four directions by the function of the grounding spring members 78 the module 101 does not jump or bounce horizontally.

Each terminal 61 has cantilever-like first and second contact arm portions 68*a* and 68*b*, divided into right and left, or first and second contacting portions 64*a* and 64*b* formed on the free ends of the first and second contact arm portions 68*a* and 68*b* for contacting the contact member on the bottom of the module 101, and the upper end of the first contacting portion 64*a* is positioned higher than the upper end of the second contacting portion 64*b* when the module 101 is not inserted.

Therefore, the contacting force of the terminals 61 is stabilized, and it is possible to reliably maintain the contact state between the terminal and the contact member of the module 101 even if the dimensions of the module 101 vary.

The position of the upper end of the first contacting portion 64*a* and the position of the upper end of the second contacting portion 64*b* are determined so as to correspond to the lower limit and the upper limit in the dimension error of the module 101. The position of the bottom surface of the module 101 is at least in such a range that the first body portion 66*a*, the first arm connecting portion 69*a*, and the first contact arm portion 68*a* can generate a sufficient repulsion force, even if the distance between the upper surface and the bottom surface of the engagement shoulder portion 117 of the module 101 is in the range near the minimum value. Also, the position of the bottom surface of the module 101 is at least in such a range that the second body portion 66*b*, the second arm connecting portion 69*b*, and the second contact arm portion 68*b* can generate a sufficient repulsion force, even if the distance between the upper surface and the bottom surface of the engagement shoulder portion 117 of the module 101 is in the range near the maximum value.

The first contacting portion 64*a* and the second contacting portion 64*b* of each terminal 61 are provided for the same module contact member. Therefore, the terminal 61 has a plurality of places for contacting the contact member of the module 101, and contact between the terminal 61 and the contact member can be reliably maintained even if the socket 1 receives impact from the outside due to any cause.

The module 101 is sandwiched and held from above and below by the locking spring members 77 engaging the upper surfaces of the engagement shoulder portions 117 and the first contacting portions 64*a* or the second contacting portions 64*b* contacting the contact members, when the module 101 is inserted. This makes it possible to reliably maintain the contact state between the terminal 61 and the contact member of the module 101 and it is possible to prevent slipping off of the module 101 since the function for locking the module 101 is strong.

The present invention is not limited to the above-described embodiments, and may be changed in various ways based on the gist of the present invention, and these changes are not eliminated from the scope of the present invention.

What is claimed is:

1. A socket for a module for accommodating a module, the socket comprising:

an insulative housing member, the insulative housing member including side walls for surrounding sides of the module;

a plurality of conductive terminals supported by the housing member, each conductive terminal being disposed in a terminal mounting recess disposed in a lower end of the side walls; and a plurality of elastic engagement elements extending inward from the side walls for securing the module within the socket;

wherein each terminal includes cantilevered first and second contact arm portions arranged in pairs and first and second contacting portions, the first and second contacting portions being respectively formed on free ends of the first and second contact arm portions for contacting a contact member disposed on the bottom of the module, the first contacting portion free end being disposed on the terminal at a position higher than the second contacting portion free end.

2. The socket according to claim 1, wherein either first or second contacting portion free end elastically contacts the module contact member and applies an upward force to the module when the module is inserted into the socket.

3. The socket according to claim 1, wherein the positions of each first and second contacting portion free end is determined so as to correspond respectively to a lower limit and upper limit of a dimensional tolerance range of the module.

4. The socket according to claim 1, wherein each first and second contacting portion free end is provided for a single contact member of the module.

5. The socket according to claim 1, wherein each terminal first and second contacting free end extends above a bottom portion of the socket.

6. The socket according to claim 1, wherein the module is provided with engagement shoulder portions on its sides, the engagement shoulder portions being held vertically by elastic engagement elements engaging upper surfaces thereof.

7. A camera module socket for mounting a camera module to a circuit board, the camera module socket comprising:

a conductive outer shell, the conductive outer shell including a plurality of side walls that cooperatively define a hollow enclosure for receiving a camera module therein, at least two of the side walls include engagement elements supported thereby and extending inwardly from side walls into the hollow enclosure for securing the camera module within the camera module socket; and a terminal assembly supporting a plurality of conductive terminals, the terminal assembly being disposed in terminal mounting recesses disposed in a lower end of the hollow enclosure, each terminal including a tail portion and a contact portion interconnected by an intermediate portion;

wherein each contact portion further includes a bifurcated end, the bifurcated end comprising first and second contact arms that extend in a cantilevered fashion from the intermediate portion, each contact arm comprising respective first and second free ends as a contact portion and extending out from the intermediate portion so that for each such terminal, the first and second contact arm free ends are at different elevations with respect to each other.

8. The camera module socket according to claim 7, wherein the terminal assembly includes an insulative housing.

9. The camera module socket according to claim 8, wherein the outer shell further includes at least two camera module socket engagement members that depend downwardly into the hollow enclosure.

10. The camera module socket according to claim 8, wherein each intermediate portion has a generally inverted U-shape.

11. The camera module socket according to claim 7, wherein each first and second terminal contact arm is bent at two different respective angles with respect to the intermediate portion.

12. The camera module socket according to claim 11, wherein the angle between the first contact arm and the intermediate portion is less than the angle between the second contact arm and the intermediate portion.

13. The camera module socket according to claim 7, wherein the first contact arm free end is disposed at an elevation within the hollow enclosure that is higher than an elevation of the second contact arm free end.

14. The camera module socket according to claim 10, wherein each contact arm is separated from each other by an intervening slit that extends from the free end into the intermediate portion.

15. The camera module socket according to claim 14, wherein the insulative housing further includes openings formed in a bottom thereof, the opening receiving portions of the first and second contact arms.

16. The camera module socket according to claim 8, wherein the terminals are supported by opposing walls of the insulative housing.

17. The camera module socket according to claim 15, further including engagement elements disposed on the outer shell walls.

18. The socket according to claim 6, wherein the first or the second contacting portion free end contacts the module contact members when the module is inserted into the socket.

19. The camera module socket according to claim 8, wherein each contact arm extends upwardly within the hollow enclosure.

20. The camera module socket according to claim 13, wherein the elevations of each respective free end corresponds respectively to a lower limit and upper limit of a dimensional tolerance range of the camera module.

* * * * *